Sept. 8, 1959
G. W. MESZAROS
2,903,639
CURRENT SUPPLY APPARATUS
Filed July 2, 1957
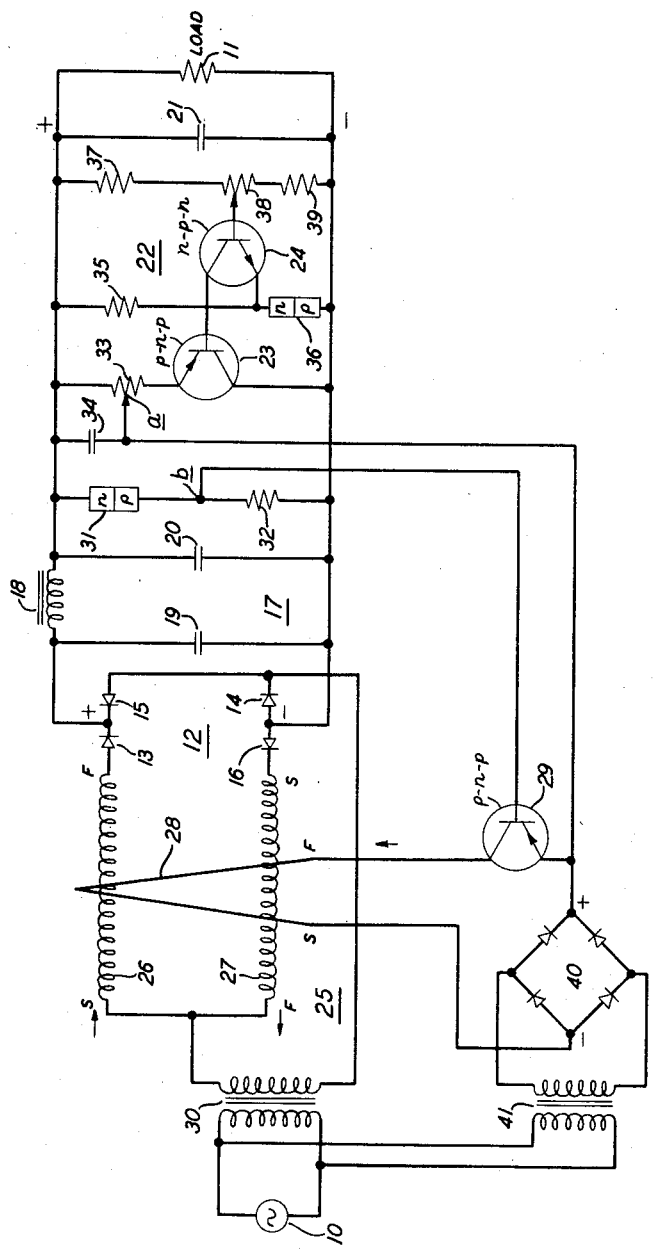
INVENTOR
G. W. MESZAROS
BY
G. F. Heneman
ATTORNEY United States Patent Office 2,903,639
Patented Sept. 8, 1959

2,903,639

CURRENT SUPPLY APPARATUS

George W. Meszaros, New York, N.Y., assignor to Bell Telephone Laboratories, Incorporated, New York, N.Y., a corporation of New York Application July 2, 1957, Serial No. 669,644

3 Claims. (Cl. 321—18)

This invention relates to current supply apparatus and particularly to improved regulated rectifying apparatus.

An object of the invention is to provide a regulating circuit having a shunt transistor regulator responsive to load voltage for minimizing load voltage changes and a saturable reactor regulator for limiting the current supplied to the shunt transistor.

A further object is to provide an improved shunt transistor regulator having a relatively wide load current operating range.

In a specific embodiment of the invention herein shown and described for the purpose of illustration, a rectifier is provided for supplying unidirectional current from its output to a load circuit including a load. Current from an alternating-current supply source is supplied through the impedance or power windings of a saturable reactor to the rectifier. For minimizing instantaneous load voltage changes there is provided in the load circuit a shunt transistor regulator comprising a transistor in a shunt path across the load circuit and a transistor-amplifier responsive to load voltage for controlling the current through the shunt path.

To prevent damage to the shunt transistor due to excessive power dissipation therein and to increase the load current operating range, the impedance of the impedance windings of the saturable reactor is increased in response to an increase of average current through the shunt transistor and decreased in response to a decrease of average current, thereby controlling the current from the alternating-current source supplied to the rectifier to control its output voltage. For this purpose, the control winding of the saturable reactor is energized by current transmitted through the emitter-collector path of a transistor upon the base-emitter circuit of which is impressed a voltage equal to the difference of a substantially constant reference voltage and the voltage across a resistor in series with the shunt transistor.

The invention will now be described in greater detail with reference to the accompanying drawing, the single figure of which is a schematic view of a current supply circuit embodying the invention.

Referring to the drawing, there is provided a circuit for rectifying current from an alternating-current supply source 10 and for supplying the rectified current to a load 11 which may vary. The current is rectified by a rectifier 12 comprising rectifying elements 13, 14, 15 and 16 and there is provided a ripple filter 17 for suppressing alternating components of the rectified current. The filter 17 comprises a series inductor 18 and shunt condensers 19 and 20. An additional filtering condenser 21 is connected across the load. There is provided a shunt transistor regulator 22 comprising a p-n-p type transistor 23 and and n-p-n type transistor 24. A saturable reactor regulator 25 comprising impedance or power windings 26 and 27, a control winding 28 and a p-n-p type transistor 29 is also provided. Each of the transistors 23, 24 and 29 comprises emitter, collector and base electrodes.

The alternating-current supply source 10 is connected to the primary of a transformer 30. One terminal of the secondary of transformer 30 is connected to a common terminal of windings 26 and 27 and the other terminal of the secondary transformer winding is connected to a common terminal of rectifying elements 14 and 15. Windings 26 and 27 may be similarly wound on the outer legs, respectively, of a three-legged core of magnetic material going from a start "S" terminal to a finish "F" terminal and control winding 28 may be similarly wound on the middle leg of the core. The currents flowing through the several windings of the saturable reactor are in the directions indicated by the arrows in the drawing. The magnetomotive force produced by the current supplied to winding 28 aids the magnetomotive forces due to windings 26 and 27, respectively, in the magnetic circuits of the saturable reactor.

One of the circuits for supplying current to the load may be traced from the upper terminal of the secondary of transformer 30, when it is positive with respect to the potential of its lower terminal, through winding 26, rectifier element 13, inductor 18, load 11 and rectifier element 14 to the lower terminal of the secondary transformer winding. A similar unidirectional current path may be traced from the lower terminal of the secondary of transformer 30, when it is positive, through rectifier element 15, inductor 18, load 11, rectifier element 16 and winding 27 to the upper terminal of the secondary transformer winding.

Four parallel current paths are provided across the load. One of the paths comprises in series a constant voltage p-n junction diode 31 and a resistor 32. A second of the paths comprises a potentiometer 33 and the emitter-collector path of the shunt transistor 23 in series, a condenser 34 being provided in a path connecting the variable tap of potentiometer 33 to the positive load terminal. A third of the parallel paths comprises in series a resistor 35 and a constant voltage p-n junction diode 36. The fourth path comprises in series a resistor 37, a potentiometer 38, and a resistor 39.

There is provided a bridge rectifier 40 having a pair of input terminals connected to the secondary of a transformer 41, the primary of the transformer being connected to the alternating-current supply source 10. A circuit is provided for supplying current from rectifier 40 through the emitter-collector path of transistor 29, into the F terminal and out of the S terminal of control winding 28. The variable tap of potentiometer 33, designated $a$, is connected to the emitter of transistor 29 and the common terminal of diode 31 and resistor 32, designated $b$, is connected to the base of transistor 29.

The current supply circuit operates to maintain the load voltage substantially constant for any fixed setting of potentiometer 38. Let it be assumed that the load voltage increases by a small amount due to an increase of line voltage or a decrease of load current, for example. The base of transistor 24 will thus become relatively more positive with respect to its emitter and, as a result, increased current will flow through potentiometer 33 into the emitter and out of the base of transistor 23 and into the collector of transistor 24. Therefore, the current flowing in the shunt current path comprising potentiometer 33 and the emitter-collector path of transistor 23 will increase. The output voltage of the rectifier-filter 12, 17 will thus decrease to minimize the initially assumed increase of load voltage.

The shunt transistor 23 is subject to damage due to excessive power dissipation within the transistor and the saturable reactor regulator 25 is therefore provided to prevent the flow of excessive average current through the shunt current path comprising the emitter-collector path of transistor 23. The transistor regulator responds instantaneously to load voltage changes for minimizing the changes of load voltage. The saturable reactor regulator responds relatively slowly to changes of the average current in the shunt path to minimize changes of average current in the shunt path. This combination of the shunt transistor regulator and the saturable reactor regulator permits the load current range to be greatly increased with respect to the load current range of a circuit using only the shunt transistor regulator for regulating the load voltage.

Point $a$ is always positive with respect to point $b$ because the voltage drop across the diode 31 is larger than the voltage drop across the portion of potentiometer 33 between the positive load terminal and point $a$. As the current in the shunt path increases, point $a$ will become less positive with respect to point $b$. Therefore an increase of current in the shunt current path will make the emitter of transistor 29 relatively less positive with respect to its base potential. As a result, less current will be supplied from rectfier 40 through the emitter-collector path of transistor 29 to the control winding 28. The impedance of windings 26 and 27 will therefore increase to reduce the current supplied from the secondary winding of transformer 30 to rectifier 12 and thus reduce the output voltage of the rectifier. The assumed increase of current flowing in the shunt current path comprising potentiometer 33 and transistor 23 is thus minimized. Therefore, excess power dissipation within transistor 23 is prevented.

What is claimed is:

1. In combination, a first and a second rectifier, a saturable reactor having an impedance winding and a control winding, means for supplying current through said impedance winding to said first rectifier, means for supplying current from said supply source to said second rectifier, a first and a second transistor, each of said transistors comprising an emitter, a collector and a base, means for supplying current from said first rectifier to a load, a first and a second resistor, a constant voltage device, a first shunt path across said load comprising said first resistor and the emitter-collector path of said first transistor in series, means for minimizing load voltage changes comprising means responsive to said load voltage changes for controlling said first transistor to control the current in said first shunt path, a second shunt path connected across said load comprising said constant voltage device and said second resistor in series, a first circuit connecting the emitter and base of said second transistor, said first circuit comprising said constant voltage device and said first resistor in series, the voltage across said constant voltage device being larger than and in opposition to the voltage across said first resistor in said circuit, and means for controlling the output voltage of said first rectifier in response to a change of current flowing through said first shunt path comprising a second circuit connecting the collector-emitter path of said second transistor and said control winding in series to said second rectifier.

2. In combination, a first rectifier for supplying rectified alternating current to a load circuit including a load, a saturable reactor having an impedance winding and a control winding, means for supplying to said control winding current for controlling the impedance of said impedance winding, means for supplying current from an alternating-current supply source through said impedance winding to said first rectifier, a resistor, a transistor having a plurality of electrodes comprising an emitter and a collector, means responsive to an increase of load voltage for reducing the resistance across said load circuit to thereby minimize said increase of load voltage, said last-mentioned means comprising the emitter-collector path of said transistor and said resistor in series in a shunt path across said load, a second rectifier, and means responsive to an increase of voltage across said resistor for controlling the current supplied from said second rectifier to said control winding to thereby increase the impedance of said impedance winding.

3. In combination, means comprising a first rectifier for supplying rectified alternating current from a supply source to a load circuit including a load, means for controlling the current supplied to said load circuit comprising a saturable reactor having an impedance winding and a control winding, a resistor, a first and a second transistor each having an emitter, a collector and a base, means responsive to an increase of voltage across said load for reducing the resistance across said load circuit and in parallel with said load to thereby minimize said increase of load voltage, said last-mentioned means comprising the emitter-collector path of said first transistor and said resistor in series in a shunt path across said load, means comprising a second rectifier for supplying unidirectional current through the emitter-collector path of said second transistor to said control winding, and means responsive to an increase of voltage across said resistor for increasing the resistance of the emitter-collector path of said second transistor.

References Cited in the file of this patent

UNITED STATES PATENTS

| | | |
|---|---|---|
| 2,751,545 | Chase | June 19, 1956 |
| 2,751,550 | Chase | June 19, 1956 |
| 2,790,127 | Hamilton | Apr. 23, 1957 |
| 2,810,877 | Silver | Oct. 22, 1957 |